(12) United States Patent
Li et al.

(10) Patent No.: US 7,921,329 B2
(45) Date of Patent: Apr. 5, 2011

(54) WORKER THREAD CORRUPTION DETECTION AND REMEDIATION

(75) Inventors: Eric Li, Redmond, WA (US); Dragos C. Sambotin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 11/801,309

(22) Filed: May 9, 2007

(65) Prior Publication Data

US 2008/0282111 A1 Nov. 13, 2008

(51) Int. Cl.
*G06F 11/00* (2006.01)
(52) U.S. Cl. .......... 714/17; 714/19; 714/49; 714/54
(58) Field of Classification Search ............ 714/38, 714/49, 54, 16, 17, 19
See application file for complete search history.

(56) References Cited

U.S. PATENT DOCUMENTS

| | | | |
|---|---|---|---|
| 6,167,423 A | 12/2000 | Chopra et al. | |
| 6,457,142 B1 * | 9/2002 | Klemm et al. | 714/38 |
| 6,889,159 B2 | 5/2005 | Klotz et al. | |
| 6,901,558 B1 | 5/2005 | Andreas et al. | |
| 6,941,379 B1 | 9/2005 | Dingsor et al. | |
| 7,502,968 B2 * | 3/2009 | Betancourt et al. | 714/38 |
| 7,530,072 B1 * | 5/2009 | Cheaz | 718/104 |
| 2003/0055764 A1 | 3/2003 | Arora et al. | |
| 2004/0064580 A1 | 4/2004 | Lim et al. | |
| 2005/0102631 A1 | 5/2005 | Andreas et al. | |
| 2005/0149629 A1 | 7/2005 | Kidd et al. | |
| 2006/0075303 A1 * | 4/2006 | Ulrich et al. | 714/38 |
| 2006/0129896 A1 * | 6/2006 | Rohn | 714/49 |
| 2006/0143608 A1 | 6/2006 | Dostert et al. | |
| 2006/0150186 A1 | 7/2006 | Grayver | |
| 2007/0220371 A1 * | 9/2007 | Duyanovich et al. | 714/49 |
| 2007/0220513 A1 * | 9/2007 | Hwang | 718/1 |

OTHER PUBLICATIONS

"Threads", http://developer.apple.com/documentation/Cocoa/Conceptual/Multithreading/articles/ThreadIntro.html, printed Mar. 19, 2007.
Newcomer Joseph M., "Using Worker Threads", http://www.codeproject.com/threads/usingworkerthreads.asp, printed Mar. 19, 2007.
Wienholt Nick, "Simplified Thread Synchronization in Windows Vista", http://www.developer.com/net/cplus/article.php/3663481, printed Mar. 19, 2007.

* cited by examiner

*Primary Examiner* — Joshua A Lohn
(74) *Attorney, Agent, or Firm* — Russell S. Krajec

(57) ABSTRACT

A thread has a corruption detection mechanism that compares a beginning state of a function with an ending state to determine any inconsistencies. Based on the type of inconsistency, a remedial action may be taken, such as ignoring the inconsistency, cleaning up the inconsistency, and terminating the thread with an exception. The analysis may also include analyzing various states after function execution to find problems such as incomplete transactions. Such a thread may be useful in an operating system as well as a multi-threaded application environment.

20 Claims, 2 Drawing Sheets

WORKER THREAD CORRUPTION DETECTION AND REMEDIATION

BACKGROUND

Worker threads may be used to execute functions from several services, applications, or other sources in an operating system or multi-threaded programming environment. The functions executed by a worker thread may come from several different sources and perform widely varying tasks.

Many functions, especially in an operating system, may operate using different priorities, assume different impersonations, or operate in different activation contexts. If a function terminates improperly or as a result of sloppy programming, such states may be improperly reset, which may cause various problems, including race conditions, deadlocks, livelocks, starvation, or other problems.

SUMMARY

A thread has a corruption detection mechanism that compares a beginning state of a function with an ending state to determine any inconsistencies. Based on the type of inconsistency, a remedial action may be taken, such as ignoring the inconsistency, cleaning up the inconsistency, and terminating the thread with an exception. The analysis may also include analyzing various states after function execution to find problems such as incomplete transactions. Such a thread may be useful in an operating system as well as a multi-threaded application environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
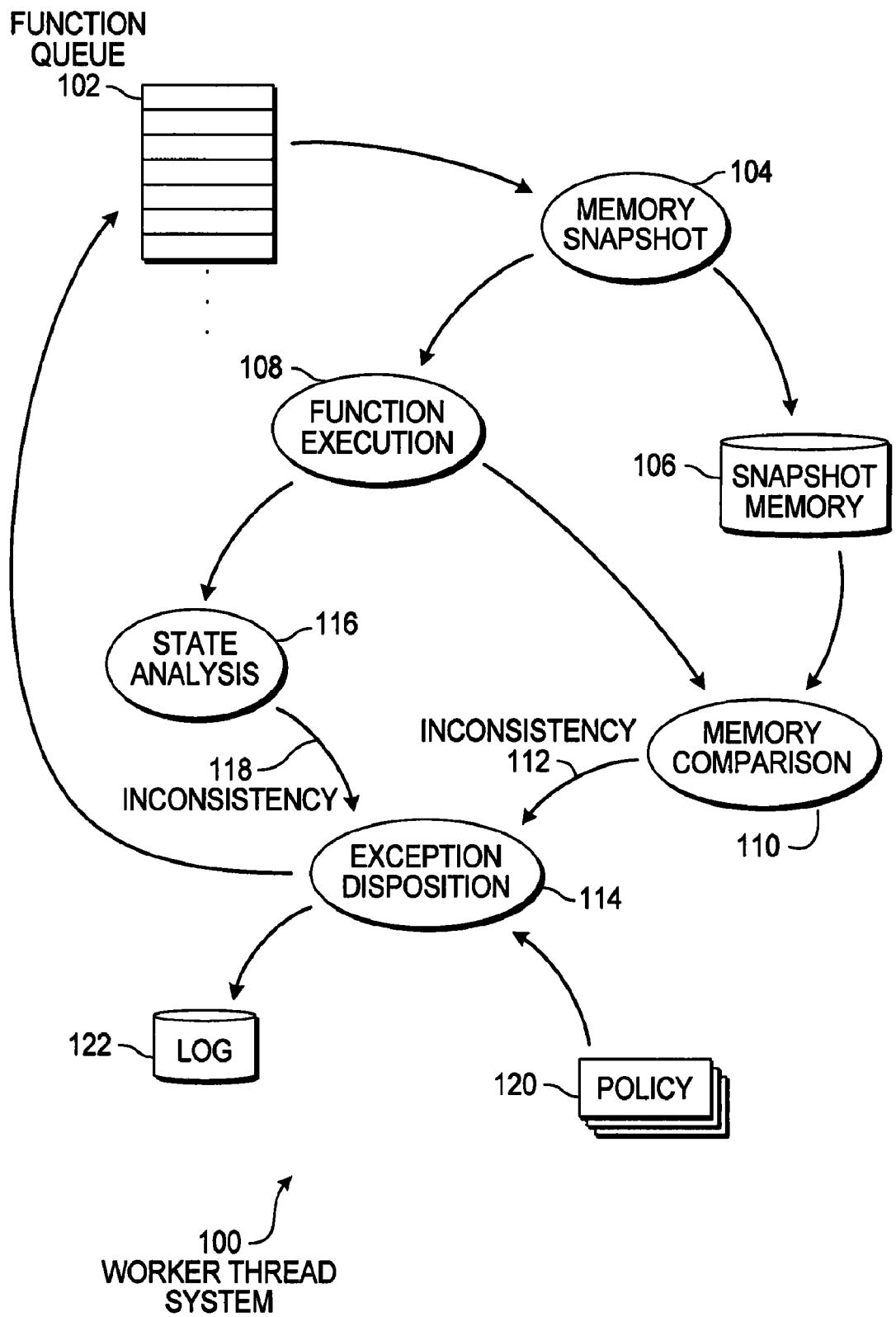
FIG. 1 is a diagram of an embodiment showing a worker thread system.

A worker thread uses several tools to ensure that functions execute in the proper environment and generate a history of events for the thread. Several variables are evaluated by comparing a pre-execution snapshot of certain memory locations with the values after execution. Additional post-execution values may be examined to determine if the function left an improper state after executing.

An analysis of an inconsistency may lead to several different resolution or remediation actions, including ignoring the inconsistency, reverting the inconsistency to a pre-execution state, raising an exception, and terminating the thread, process, application, or system. A log of such inconsistencies may be kept for debugging or other uses.

In some embodiments, the analysis, remediation, and logging functions may be different for debugging, code development, or general runtime operations. Different remediation and logging policies may be defined for various operational states.

The worker thread may execute functions from various services at an operating system level. In some embodiments, such a worker thread may be used for multi-threaded applications programming environments as well.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for processing worker threads. A worker thread may be a generic thread that executes functions from many different services. Such a thread may be used to execute multiple functions without having the overhead of starting, managing, and tearing down separate threads for each service. Embodiment 100 may be used for any type of thread management system that executes multiple functions, including those used by operating systems as well as multi-threading applications.

Embodiment 100 is a system that executes individual functions one at a time for a given worker thread. Prior to executing a function, a snapshot is made of certain key memory locations and stored. After executing the function, the current state is compared to the snapshot and any inconsistency in the state of the values is dispositioned based on a set of policies. The policies may define how specific inconsistencies are to be handled.

Embodiment 100 is a mechanism by which errors or problems during execution may be captured, logged, and handled. In some cases, programming errors or unexpected termination of a function may leave certain variables in a different state than when a function was started. For example, if a function changes the priority of the thread from low to high during execution, but fails to reset the priority upon completion, the next function executed by the thread may be performed at a high priority. Such a condition may result in a starvation of other resources while causing the thread to race.

Another analysis performed after the completion of a function is a state analysis, which may test the state of various items to ensure that the items are properly closed or set to a nominal value. An example may be an open transaction. If a transaction, such as a write action to a file for example, is started during a first function but not completed, a subsequent function may attempt to perform a different transaction but may have some residual data or effects from the previous incomplete transaction.

Each embodiment may have different parameters that are tracked, depending on the environment in which the thread operates and the various items that may be changed during the execution of a function.

For example, an embodiment directed towards an operating system may track various items that may be affected by operating system functions. The items may include operating settings for the thread, such as priority, that may affect a function that are subsequently performed by the worker thread. The items may also include various flags or settings that restrict other threads from performing certain operations. Such items may include locks that enable one thread to perform a specific function and exclude other threads until the lock is released.

A function queue 102 may have several functions that are to be executed by the thread. The function queue may contain functions that are supplied by many different types of services and each function may have a specific set of input data with which a function will operate.

Each function may set various properties for the thread during execution. For example, a high priority function may set the thread's priority setting to high during its execution. The high priority setting for the function may enable the function to be executed in place of or faster than other functions on other threads.

In another example, a function may be executed as a specific user. Such a situation may exist when operating system functions are being performed and a specific function is executed as a user with administrative privileges. Other functions may operate as a normal user and have restricted access to certain functions or data.

In yet another example, a function may be executed with a specific activation context. An activation context may be used to redirect one or more file references to a different file reference. For example, a set of dynamic linked libraries (DLLs) may be normally used for a specific function. In some situations, a separate set of DLLs may be used for the same function by redirecting the DLL calls to the second set of DLLs.

In still another example, a thread may adjust a preferred language setting during operation. The preferred language setting may be used by various functions to select a language used by a user interface. If a first function changes the preferred language but does not reset the preferred language setting, subsequent function calls be adversely affected by displaying output in a different language than intended for the function.

In another example a thread may set an affinity for a specific processor in a multi-processor environment. The affinity setting may specify a specific processor or group of processors on which the thread will be executed. Often, certain applications or services may operate on a specific processor or group of processors in a multi-processor system. In a queue of functions from many different applications, different functions within the queue may be intended to be performed on specific processors while other functions within the same queue may be performed on any available processor.

In yet another example, a thread may set a global variable that may be used to lock out other threads from a specific function. For example, a thread may set a flag that locks out other threads from loading a dynamic linked library in to memory while the DLL is loading. During the period of time a first thread has the flag set, other threads may be waiting for the flag to be released. In various environments, many different flags may exist.

In each of the examples, a problem may occur if a function changes a setting but does not return the setting to its original state such as priority, activation context, preferred language setting, or other variable. Such a problem may exist due to abnormal termination of a function, poor programming techniques, or other issues. Examples of such problems include racing, saturation, deadlocks, livelocks, or other problems.

Prior to executing the function, a memory snapshot module 104 may copy the state of some variables in to a snapshot memory 106. The specific variables chosen for capture may vary between embodiments. After storing the values, the function is executed by a function execution module 108.

After the function terminates, either normally or abnormally, a memory comparison module 110 may compare the current state of the stored variables with the snapshot memory 106 to determine if any inconsistencies exist. An inconsistency 112 may be transferred to an exception disposition module 114 for disposition.

Additionally, a state analysis module 116 may compare various states that are settable by a function to see if the states differ from a normal setting. An example of such a state may be an in-process transaction that has not yet been completed or a global variable flag that is not released.

The state analysis module 116 may evaluate variables that could be changed by an executing function but the variables have a standard or normal setting. The state analysis module 116 may compare a current value with a standard value rather than comparing to a saved value in a snapshot memory 106 as does the memory comparison module 110.

Since the state analysis module 116 does not use memory locations stored in a snapshot memory, the state analysis module 116 may use less resources than a memory comparison module 110. However, the memory comparison module 110 may have more flexibility in implementation.

The exception disposition module 114 may perform different remedies for an inconsistency. For example, an inconsistency may be ignored, a value may be reset to a previous or normal value, the condition may be logged to a log file 122, an exception may be created, the thread, process, application, or system terminated, or any other action or combination of actions may be taken.

In some instances, an inconsistency in a data value or variable may be ignored. Such an action may be taken when the severity of the inconsistency is minimal. In some embodiments, ignoring a value may also be logged to a log file 122. The log file 122 may be any storage mechanism arranged in any fashion to store relevant data about an inconsistency upon completion of a function. In a typical embodiment, a log file may store information about the function that was executed, the inconsistency type, the values before and after execution, the time the inconsistency occurred, and other relevant data. The log file 122 may be analyzed for debugging as well as measuring the quality or performance of software applications.

Data inconsistencies may be reset to a previous value in some cases. For example, a flag set by a function that prevents other threads from performing various functions may be unset. In some cases, a priority setting may be reset to an initial value or an incomplete transaction may be aborted.

In some instances, an inconsistency may be determined to be severe enough to halt execution of a thread, throw an exception, or start some other severe error handling process.

In some embodiments, a set of policies 120 may be used to determine different modes of operation. For example, in a debugging mode, specific inconsistencies may be handled by logging the error and continuing operation. In a normal runtime mode, the same inconsistencies may be handled by resetting the variable in question to a normal, default, or previous value and continuing operation.

In many embodiments, a set of policies may direct specific actions to be taken based on the type of inconsistencies. The type of inconsistency may be defined as a specific variable that is changed or a specific variable that is changed to a specific value. For example of the first type, if a priority value is changed from normal to high, a policy may have the priority value reset to a default value of normal. Similarly, when the same priority value is changed from high to low, the priority value may again be reset to the default value of normal. A different policy may have the priority value reset to the last value, without having a default value.

Some embodiments may have complex policies that may apply different actions or criteria based on the function that is executed. For example, a network initialization function that changes priority may be ignored but a display driver function that changes priority may be reset to a default value.

Further, some embodiments may take into consideration the value of the variable when applying a disposition action. Using a priority example, an ending priority value of high may be reset to normal, but an ending priority value of low may be logged but not changed.

After an inconsistency is dispositioned by the exception disposition module 114, another function is selected from the function queue 102 and the process repeats.

Figure 2:
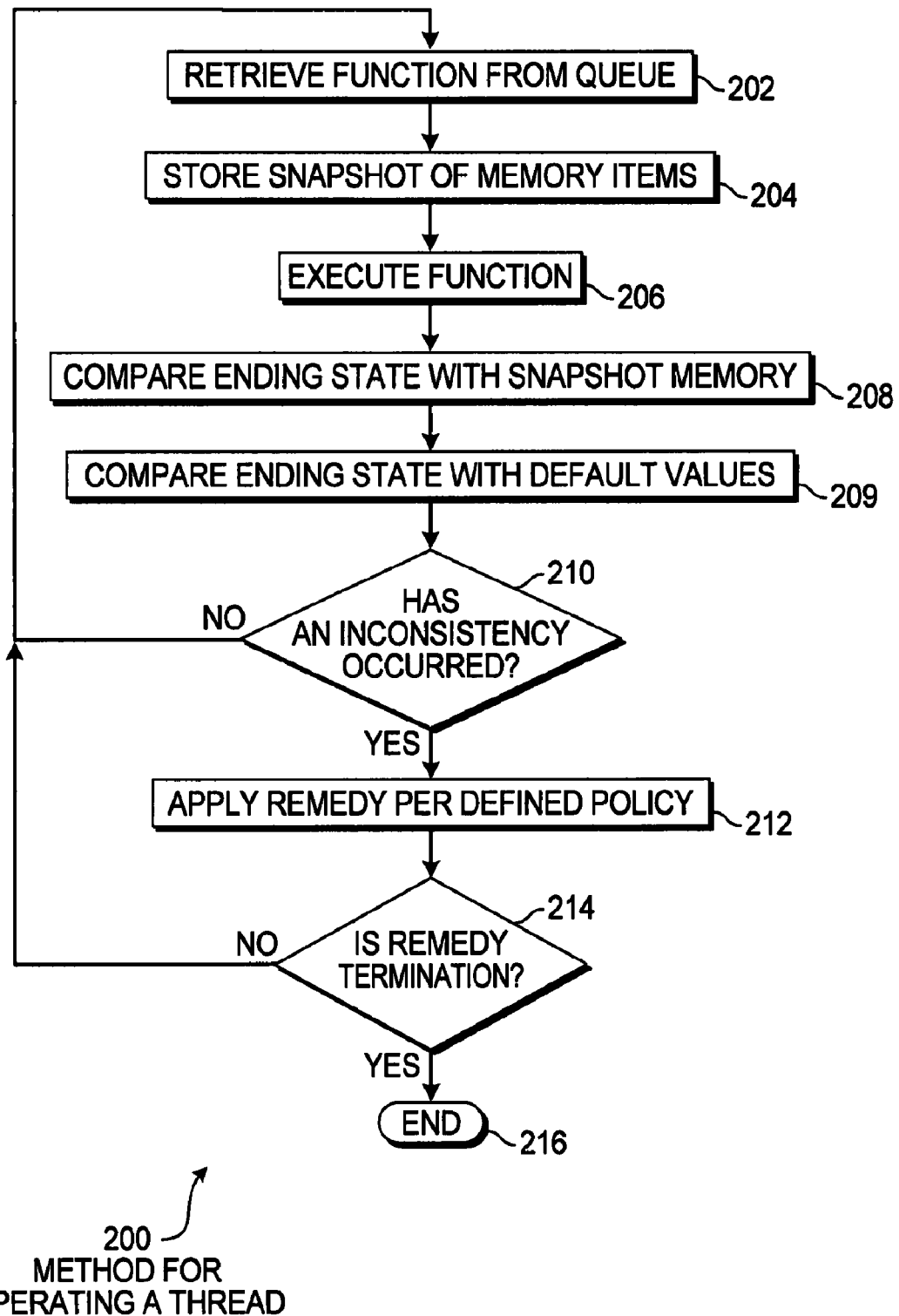
FIG. 2 is a flowchart illustration of an embodiment showing a method for operating a worker thread.

FIG. 2 is a flowchart illustration of an embodiment 200 showing a method for operating a thread. The embodiment 200 is one method by which changes to certain variables may be detected and dispositioned when a function is executed in a thread.

Embodiment 200 is one method to detect inconsistencies between a starting and ending value of a flag, variable, or other setting that may be changed by an executing function. Once detected, the inconsistencies may be evaluated and an appropriate disposition performed. The disposition may ignore the problem, log the problem, attempt to correct or otherwise remedy the problem, or perform some other action. The disposition may make it possible for subsequent functions to be executed without problems as well as providing feedback for debugging in some cases.

In block 202, a function is retrieved from a queue of functions to be executed. The queue may be populated by various services, applications, or other mechanisms or devices that may add functions to be executed to the queue. In some embodiments, the thread may perform operating system level functions, while other embodiments may be any type of multi-threading environment.

One example of a multi-threading environment may be a router or other network device that handles different transmitted packets using individual threads. Other examples may be a multi-threading computer application.

In each example, an inadvertent problem may be caused when a thread changes a state of a variable that may have detrimental consequences on subsequent functions executed on the thread. For example, if one function changes the priority setting to low, future functions may be executed at low priority and not be executed as intended, leading to a starvation situation.

Variable changes may occur due to improper programming techniques, inadvertent or unintentional termination of a function, or other reasons. By monitoring and dispositioning any improper variable changes, the processes may be made to continue, despite the errors. Such a method may make a system more tolerant to bugs or errors in program code and enhance system reliability.

The variables to be tracked are stored in a snapshot memory in block 204. In each embodiment, different variables may be tracked or monitored. In some instances, such as during a debugging effort, one or two specific variables of interest may be stored in order to isolate a suspected problem with the variable. In other instances, a whole host of variables may be stored and monitored as a fault-tolerance measure.

After the function is executed in block 206, the ending state of the variables of interest is compared to the snapshot memory in block 208. The results of a comparison may be to identify any inconsistency between an initial value and a final value.

Similarly, some ending state values are compared with default values in block 209. When comparing an ending value with an initial value, there are some overhead operations for storing the initial values, keeping the values in memory, and retrieving the values. By comparing the final values to default values, much of the overhead may be reduced and thus not cause as much of a performance degradation.

If no inconsistency has been found in block 210, the process returns to block 202 and another function may be selected.

If at least one inconsistency has been found in block 210, a remedy may be applied per a defined policy in block 212. If the remedy is to terminate the thread in block 214, the process terminates in block 216, otherwise, the process returns to block 202.

The remedy for an inconsistency may be any set of predefined actions, including ignoring the inconsistency, logging the inconsistency in a log file, resetting the variable or flag to a different value, throwing an exception, terminating the process, or any other action.

In some embodiments, a remedy may be defined for a specific type of inconsistency or for an inconsistency of a specific variable. In other embodiments, complex logic may be used to determine a remedy, taking into account the function name, the inconsistent variable, the amount with which the variable differs from the initial value, to which service the function belongs, or any other factor.

In some embodiments, multiple policies may be defined and put in place for different operational situations. For example, a normal operational policy may define several variables that are tracked and have remedies applied to the variables that tend toward resetting an inconsistency. A debugging policy may be used on the same system that tends to capture inconsistencies in a large number of variables, log the inconsistencies, and terminate the process when an inconsistency is found.

Each embodiment may have different priorities for selecting variables to track and performing remedial actions based on the inconsistencies found.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A worker thread comprising:
   a queue adapted to store a plurality of functions to be executed;
   a memory snapshot mechanism adapted to store a predefined set of data prior to function execution, said predefined set of data being stored in a snapshot memory;
   a function execution mechanism adapted to execute one of said plurality of functions;
   a memory comparison mechanism adapted to compare a final memory state to said snapshot memory after said one of said plurality of functions is executed, said memory comparison mechanism adapted to determine an inconsistency;
   an exception disposition mechanism adapted to perform a remedial action based on said inconsistency, said remedial action comprising resetting said inconsistency to a value in said snapshot memory.

2. The worker thread of claim 1 further comprising a logging function adapted to generate a log comprising said one of said plurality of functions and said inconsistency.

3. The worker thread of claim 1, said plurality of functions being provided from a plurality of operating system services.

4. The worker thread of claim 1, said predefined set of data comprising at least one of a group composed of activation context, user impersonation, affinity, and preferred language.

5. The worker thread of claim 1 further comprising:
   a state analysis mechanism adapted to determine if a set of specific states is present when said one of said plurality of functions has completed execution.

6. The worker thread of claim 5, said state analysis mechanism further adapted to detect that a transaction is being processed, said transaction being defined by said set of specific states, and identifying said transaction as an incomplete transaction.

7. The worker thread of claim 1, said remedial action further comprising at least one of a group composed of:
   ignoring said inconsistency; and
   terminating said worker thread.

8. The worker thread of claim 1 further comprising a plurality of policies for said exception disposition mechanism, each of said plurality of policies having a remedial action associated with a type of inconsistency.

9. The worker thread of claim 8 having a first policy for debugging and a second policy for normal operation.

10. A method, operating within a worker thread, comprising:
    retrieve a function from a queue of functions to be executed;
    storing a snapshot of a predefined set of memory items in a snapshot memory;
    executing said function;
    comparing said set of predefined memory items to said snapshot memory after said function has been executed to determine at least one inconsistency; and
    performing a remedial action based on said inconsistency, said remedial action comprising resetting said inconsistency to a value in said snapshot memory.

11. The method of claim 10, said predefined set of memory items comprising at least one from a group composed of: priority, activation context, user impersonation, affinity, and preferred language.

12. The method of claim 10 further comprising:
    analyzing a final state after said function has executed to determine at least one inconsistency.

13. The method of claim 12 further comprising detecting that a transaction is being processed, and identifying said transaction as an incomplete transaction.

14. The method of claim 10 further comprising:
    logging said function and said inconsistency.

15. The method of claim 10 further comprising applying a set of policies to determine said remedial action based on said inconsistency.

16. The method of claim 15 further comprising switching between a first set of policies and a second set of policies.

17. A computer readable medium comprising computer executable instructions adapted to perform the method of claim 10.

18. A method, operating within a worker thread, comprising:
    retrieve a function from a queue of functions to be executed;
    executing said function;
    analyzing a final state after said function has executed to determine at least one inconsistency;
    selecting a remedial action to perform, said remedial action comprising resetting a variable related to said inconsistency to a first state stored prior to said executing;
    performing said remedial action based on said inconsistency.

19. The method of claim 18, said remedial action further comprising at least one of a group composed of:
    ignoring said inconsistency; and
    terminating said worker thread.

20. A computer readable medium comprising computer executable instructions adapted to perform the method of claim 19.

* * * * *